3,773,828
PRODUCTION OF ACRYLIC ACID
Koju Kadowaki and Takeo Koshikawa, both of 1315 Oaza-Wakaguri, Ami-machi, Inashiki-gun, Ibaraki-ken, Japan
No Drawing. Filed Dec. 28, 1971, Ser. No. 213,181
Claims priority, application Japan, Dec. 28, 1970, 46/119,639
Int. Cl. C07c 51/26, 57/04
U.S. Cl. 260—530 N                                11 Claims

ABSTRACT OF THE DISCLOSURE

An $\alpha,\beta$-unsaturated aldehyde, e.g. acrolein, is subjected to a vapor-phase catalytic oxidation to produce the corresponding $\alpha,\beta$-unsaturated carboxylic acid, e.g. acrylic acid, in the presence of an oxidation catalyst comprising molybdenum, vanadium and oxygen, which catalyst has been produced through the use as at least a part of a vanadium source of vanadyl oxalate in an aqueous medium.

BACKGROUND OF THE INVENTION

Field of the invention

The present invention relates to the production of $\alpha,\beta$-unsaturated carboxylic acid, for example, acrylic acid by subjecting an $\alpha,\beta$-unsaturated aldehyde, for example, acrolein, to vapor phase catalytic oxidation. More particularly, this invention relates to the production of a highly effective catalyst comprising, molybdenum, vanadium and oxygen.

Prior art

Catalysts comprising molybdenum oxide and vanadium oxide have so far been proved to be effective as catalysts for the production of $\alpha,\beta$-unsaturated carboxylic acid by the vapor phase catalytic oxidation of $\alpha,\beta$-unsaturated aldehydes, and their examples can be seen, for example, in Japanese patent publication No. 44/12,886 (1969), No. 41/1,775 (1966) and No. 38/17,007 (1963). These catalysts are of significance in that they have brought about respective solutions. To the best of our knowledge, however, their performances cannot be said to be always industrially satisfactory. For example, in the case of Japanese patent publication No. 41/1,775, the yield of acrylic acid obtained by oxidizing acrolein is 76 mol percent.

Accordingly, many investigations on the increase of the oxidation yield have been conducted, and discoveries have been made, as disclosed in Japanese patent publication No. 44/12,129 (1969) to add tungsten as a promoter in addition to molybdenum, vanadium and oxygen as constituent elements of the catalyst, and as disclosed in Japanese patent publication No. 43/9,045 (1968) to carry out the activation of the catalyst with the addition of aluminum and by a special pretreatment, for example. However, either the fact that a special metallic component should be used, or the fact that a special treatment should be carried out, may be said to meet not always with a favorable reception from the standpoint of the industrial practice.

SUMMARY OF THE INVENTION

It is an object of this invention to bring about a solution to this problem by providing a highly effective catalyst of a comparatively simple system comprising molybdenum, vanadium and oxygen, and prepared in the presence of vanadyl oxalate which constitutes at least a part of a vanadium source.

According to this invention, briefly summarized, there is provided a process for producing $\alpha,\beta$-unsaturated carboxylic acid by oxidizing $\alpha,\beta$-unsaturated aldehyde which comprises bringing a gaseous mixture comprising an $\alpha,\beta$-unsaturated aldehyde and molecular oxygen into contact with an oxidation catalyst which comprises molybdenum, vanadium, and oxygen and has been produced from a catalyst component source comprising a molybdenum source or Mo-containing compound and a vanadium source or V-containing compound through a state wherein an aqueous medium is present and characterized in that the production of the said catalyst has been accomplished by causing at least a part of the said vanadium-containing compound to be present in the aqueous medium as vanadyl oxalate.

As has been shown above, one of the features of this invention is that vanadyl oxalate is caused to be present in the process for the preparation of the catalyst, but this feature may be attained either by using vanadyl oxalate itself as a vanadium-containing compound, or by using other vanadium-containing compounds such as vanadium pentoxide and mixing it with oxalic acid, so that the procedure of preparation of the catalyst is not essentially different from that of Mo-V-O system catalysts. Nevertheless, the yield of acrylic acid by oxidation of acrolein reaches a value as high as 92 mol percent.

The mechanism of action of oxalic acid in the process has not been completely clarified, but this will not limit the possibility of considering a mechanism such as the oxidation state of the catalyst controlled by the reductive action of oxalic acid, or a combination state of the molybdenum and the vanadium readily forming an active compound.

DETAILED DESCRIPTION

Basic catalyst

The process for the production of the catalyst of this invention from which such an effect is expected is fundamentally similar to the one that can be employed for the production of Mo-V-O system catalysts from a molybdenum-containing compound and a vanadium-containing compound, being not essentially different on this point from the known processes mentioned before. In this fundamental process, an aqueous medium is ordinarily used in order to dissolve or disperse at least one of the molybdenum source and the vanadium source, or to shape the catalyst into a certain form. For example, ammonium molybdate and ammonium metavanadate are mixed in an aqueous solution state.

In the fundamental process for preparing the Mo-V-O system catalyst through a state where such an aqueous medium is present, this invention allows the vanadium-containing compound to be present as vanadyl oxalate in the aqueous medium. In this case, all of the vanadium-containing compound need not be vanadyl oxalate, more than 15 mole percent, preferably more than 25 mole percent, of it being replaced with vanadyl oxalate.

Any means of causing at least a part of the vanadium-containing compound to be present as vanadyl oxalate is possibly employed. However, one method is to use vanadyl oxalate itself as a vanadium-containing compound, or a mixture of vanadyl oxalate and a vanadium-containing compound other than vanadyl oxalate, for example, vanadium pentoxide, a polyacid of vanadium or its salts, for example, ammonium metavanadate. Another method is to form vanadyl oxalate by mixing a vanadium-containing compound such as vanadium pentoxide, a polyacid of vanadium or its salts, for example, ammonium metavanadate, with oxalic acid or an oxalate (preferably soluble oxalate) in an aqueous medium under heating, if necessary. In the latter case, it is preferable to use 0.5–10-fold excess mole, particularly 1–6-fold excess mole, of oxalic acid in relation to the amount of the vanadium-containing compound reduced to $V_2O_5$.

As shown above, in the case where the addition of oxalic acid is resorted to as a method of causing vanadyl oxalate to be present, the oxalic acid is added to an aqueous solution of the molybdenum-containing compound and the vanadium-containing compound in a known process for producing the Mo-V-O system catalyst as mentioned before. When the oxalic acid is used in the form of salt, another component (particularly a positive ion component) comes into the aqueous solution in some instances. In such a case, the use of ammonium salts or amine salts which contain volatile positive ions is desirable. Moreover, the residual effect of nonvolatile positive ions can be expected, if desired, using a compound containing the nonvolatile positive ion.

As mentioned before, the process for producing the catalyst of this invention does not essentially differ from the known processes mentioned before or others, except that oxalic acid (or an oxalate) is used when vanadyl oxalate is not used as a vanadium-containing compound. Therefore, at first a consideration as to the formation of vanadyl oxalate mentioned above has been taken into account, then the molybdenum-containing compound and vanadium-containing compound are selected from a group of the compounds recommended in the known process mentioned before. In particular, it is preferable that at least one of the two compounds (preferably both of the compounds) is soluble in the aqueous medium. For simplicity, an aqueous solution of ammonium molybdate is mixed with an oxalic acid solution of vanadium pentoxide.

The thus obtained aqueous solution containing the vanadium-containing compound, the molybdenum-containing compound and oxalate ions, to which a carrier appropriate for the solution is added whenever the occasion requires, is evaporated to dryness and dried, then subjected to calcination.

The calcination of the catalyst is carried out in the presence of oxygen gas, usually in the presence of air, at an appropriate temperature in the range of 270 to 450° C., and for an appropriate time of 1–40 hours. The optimum temperature varies to some extent with the used raw material and the composition. When the temperature is below the range mentioned above, the raw material salt is insufficiently converted to its oxide, whereas when the temperature is too high the effect of the catalyst is lowered because of the occurrence of transformation to a compound or internal structure inappropriate for the catalyst. At the time of the calcination, air is preferable for the atmosphere of the calcination. However, air is not always necessary for the atmosphere, and only the presence of molecular oxygen is required so that it is possible to use an oxygen mixed gas diluted with carbon dioxide, nitrogen or steam or a combustion gas such as methane, city gas, etc.

The form of the catalyst of this invention is not particularly limited, but for economy, the high activity characteristic of the catalyst is made use of by using a carrier. For example, a liquid composition for the catalyst can be supported by immersion on a shaped carrier of alumina, silica-alumina or silicon carbide, or the liquid composition when mixed with a powdery or colloidal carrier of alumina, silica, diatomaceous earth, etc., can be made into such a form as to suit the purpose.

In order for the catalyst to produce a high effect in the oxidation reaction of $\alpha,\beta$-unsaturated aldehyde, the atomic ratio of Mo:V in it is preferably in the range of 100:5 to 70, particular 100:10 to 40.

Modified catalyst

The feature of this inventive catalyst is in that a high effect which has not been expected from the conventional ones can be produced by using the simple system comprising molybdenum, vanadium and oxygen. However, it is also possible, if desired, to use a suitable promoter along with them.

One example of such modified catalysts refers to the one having the following composition expressed in atomic ratio without oxygen.

$$(Mo)_{100}(V)_a(Sn)_b(Fe)_c(Cu)_d(Bi)_e$$

$a=2$ to 70, preferably 5 to 40
$b, c, d,$ and $e=0$ to 100 each, preferably 0 to 40
$b+c+d+e=0$ to 100, preferably 2 to 70

In this case, as to tin, iron, copper and bismuth, the use of any one component thereof produces an effect, but a combination of two or more components is also applicable. The content of oxygen is not defined here because the respective oxidation state of the components cannot always be well-defined.

As mentioned above, the modified oxidative catalyst shown as a concrete example of this invention is conceptually equal to the one made by introducing a special component to the system comprising molybdenum, vanadium and oxygen, but the modified catalyst can be produced on the basis of the conventional process so that the highly effective catalyst which does not, of course, require a special activation treatment before use can be easily obtained.

When the modified catalyst is applied, the yield of acrylic acid by the oxidation of acrolein reaches a value as high as 95 mol percent. Moreover, these catalysts are stable over a relatively wide range of the reaction conditions, and they are allowed considerable free choices in their working conditions.

Therefore, when the production of acrylic acid is intended, not to mention the oxidation of acrolein, acrylic acid can be obtained in a high yield by bringing a gaseous oxidation product obtained in the process for producing acrolein from propylene into contact with the present catalyst without separating the acrolein from it. In particular, when the catalyst is used for the purpose of the latter, its high effect cooperating with its prominent adaptability to conditions results in many economical advantages.

Such modified catalysts can be made by adding a suitable tin-, iron-, copper- or bismuth-containing substance at an appropriate time in the process for preparing the Mo-V-O system catalyst mentioned before, particularly in a process before the burning, particularly in a process of handling an aqueous solution containing a molybdenum-containing substance, a vanadium-containing substance and oxalate ions.

As for substances containing these addition metals, tin chloride, tin hydroxide, metallic tin powder, etc. can be used for the tin component; iron nitrate, iron chloride, etc. for the iron component; copper nitrate, copper chloride, etc. for the copper component; bismuth nitrate, metallic bismuth powder, etc. for the bismuth component; and in addition a complex oxide such as iron molybdate, bismuth molybdate, and an organic acid salt such as iron oxalate, copper acetate are also usuable. The calcining and the supporting of it on a carrier is similar to those mentioned before.

Oxidation of unsaturated aldehyde

The use of the catalyst is not fundamentally different from the usual method based on the present object, that is, a gas containing $\alpha,\beta$-unsaturated aldehyde such as acrolein, methacrolein as a raw material and molecular oxygen is brought into contact with catalyst at a reaction temperature ranging from 200 to 400° C. under a pressure of 0.5–10 atmospheres for a contact time of 0.5–20 seconds.

In the composition of a reaction gas, it is preferable to use a 0.5 to a 5-fold excess mole of oxygen in relation to the aldehyde used as a raw material, and it is preferable to allow a 1 to 10-fold excess mole of steam to coexist as a dilution gas. In addition, nitrogen, carbon dioxide, methane and propane, etc. are usable as a dilution gas.

An economical process for producing acrylic acid which makes use of the present inventive process, particularly the process of using the modified catalyst mentioned before is the so-called two-step successive process in which acrylic acid is produced directly from propylene by using a catalyst for the production of acrolein by the catalytic oxidation of propylene and the catalyst of the present invention. The catalyst which is used in the prior step for the production of acrolein is not particularly limited, but those that are effective enough to produce a high per pass yield of the sum of acrolein and acrylic acid are suitable, because the total yield of acrylic acid in both the two steps increases.

It is possible to introduce the outlet gas from the prior step reactor directly to the subsequent step reactor without separating the product from the outlet gas, but the outlet gas may be, if necessary, mixed with oxygen or a dilution gas, then introduced. Further, after easily-separable water, acrylic acid, etc. of the gas, for example, have been liquefied by cooling to remove them from the outlet gas, the residual gas containing acrolein may be allowed to react.

The present invention will be described with respect to the following concrete examples wherein the conversion, yield and selectivity coefficient are expressed in moles, acrolein is symbolized by ACR, and acrylic acid is symbolized by AA.

EXAMPLES 1(A)–3(A)

In 1200 ml. of distilled water, 20.8 g. of vanadium pentoxide was suspended and dissolved under heating with the addition of 40 g. of oxalic acid. At this time, the solution assumed the intense blue color of vanadyl oxalate. To this solution were added a solution of 202 g. of ammonium molybdate dissolved in 1000 ml. of distilled water by heating and 600 ml. of porous silicon carbide of 3 $\phi$mm. sphere as a carrier, then evaporated to dryness with stirring on a water bath, whereby the catalyst components were allowed to adhere to the carrier. The obtained solid matter was dried at 120° C. for 2 hours and divided into three equal parts which each were calcined in a muffle furnace for 5 hours at 300, 340 and 380° C., respectively. The composition of the catalyst was calculated as Mo:V=5:1 in atomic ratio using the amounts of the charged catalyst components, and the percentage of the catalyst supported on the carrier (the contents of the catalyst component oxides) which is calculated by the increase in weight of the obtained catalyst was 25.7 percent.

A reaction tube of an inner diameter of 20 mm. made of stainless steel was packed with 50 ml. of the thus obtained catalyst and heated by means of a nitre bath, wherein acrolein was subjected to catalytic oxidation. A raw material gas comprising 4% of acrolein, 46% of steam and 50% of air was allowed to pass through it at a space velocity of 850 hr.$^{-1}$ with respect to the reference at 0° C. The results produced by the catalyst are shown in Table 1(A).

TABLE 1(A)

| | Calcining temp. (° C.) | Reaction temp. (° C.) | Percent Conversion of ACR | Yield of AA | Selectivity of AA |
|---|---|---|---|---|---|
| Example: | | | | | |
| 1(A) | 300 | 250 | 95.2 | 88.2 | 92.7 |
| 2(A) | 340 | 240 | 98.3 | 90.8 | 92.4 |
| 3(A) | 380 | 240 | 94.0 | 77.2 | 82.1 |

EXAMPLES 4(A)–7(A)

A catalyst having a different composition of molybdenum and vanadium was prepared in a similar manner as in Example 2(A). The catalyst composition and reaction results are shown in Table 2(A). The reaction was carried out under the same conditions as in the examples mentioned above except the reaction temperature was altered.

TABLE 2(A)

| Example | Mo/V atomic ratio | Support rate (percent) | Reaction temp. (° C.) | Percent Conversion of ACR | Yield of AA | Selectivity of AA |
|---|---|---|---|---|---|---|
| 4(A) | 95/5 | 18.3 | 300 | 97.5 | 91.0 | 93.3 |
| 5(A) | 90/10 | 20.8 | 260 | 99.6 | 92.3 | 92.8 |
| 6(A) | 80/20 | 17.4 | 230 | 99.9 | 89.5 | 89.6 |
| 7(A) | 70/30 | 15.4 | 250 | 98.0 | 88.4 | 90.2 |

EXAMPLE 8(A)

In 300 ml. of distilled water, 6.4 g. of ammonium metavanadate was dissolved by heating with the addition of 20 g. of oxalic acid. To this solution were added a solution of 47.6 g. of ammonium molybdate dissolved in 500 ml. of distilled water by heating, and further a silica sol containing 9.9 g. of $SiO_2$, then mixed sufficiently. In the next place, 250 g. of porous silicon carbide carriers of 4 $\phi$mm. sphere was added, then evaporated to dryness with stirring and further dried at 120° C. for 2 hours. A tube-type furnace was packed with the matter, which was then calcined at 360° C. for 5 hours in a steam of air, thus a silica-containing catalyst being prepared, of which the composition comprised Mo:V:Si=5:1:3 in atomic ratio, and of which the supported rate on the carrier was 20.5%.

By using this catalyst, the reactions were carried out at 250° C. under the same conditions as in Example 1(A), wherein the conversion of acrolein was 99.5%, the yield of acrylic acid was 89.0% and the selectivity coefficient was 89.5%.

EXAMPLE 9(A)

By using the catalyst mentioned in Example 2(A), the oxidation reaction of methacrolein was carried out. The composition of the raw material gas used comprised 3% of methacrolein, 45% of steam and 52% of air, the space velocity was 1050 hr.$^{-1}$, and reaction temperature was 260° C., wherein the conversion of methacrolein was 90.5%, the yield of methacrylic acid was 68.5%, the selectivity coefficient was 75.7%.

REFERENCE EXAMPLES 1(A)–3(A)

A catalyst having the same composition (Mo:V=5:1) as in Examples 1(A)–3(A) was prepared without using oxalic acid. A solution of 47.6 g. of ammonium molybdate dissolved in 500 ml. of distilled water by heating was added to a solution of 6.4 g. of ammonium metavanadate dissolved in 300 ml. of distilled water by heating. Then, 200 g. of the same Carborundum carrier as in Examples 1(A)–3(A) was added and evaporated to dryness on a water bath with stirring and further dried at 120° C. for 2 hours. The solid matter obtained was divided into three equal parts which each were calcined in a muffle furnace for 5 hours at 320, 340 and 360° C., respectively.

The reaction was carried out over each of these catalysts under the same conditions as in Examples 1(A)–3(A) except the reaction temperature was altered as described in Table 3(A). The results obtained are shown in Table 3(A).

TABLE 3(A)

| | Catalyst burning (° C.) | Supported rate (percent) | Reaction temp. (° C.) | Percent Conversion of ACR | Yield of AA | Selectivity of AA |
|---|---|---|---|---|---|---|
| Reference example: | | | | | | |
| 1(A) | 320 | 16.4 | 310 | 86.9 | 64.5 | 74.2 |
| 2(A) | 340 | 16.3 | 290 | 86.3 | 57.4 | 66.5 |
| 3(A) | 360 | 16.3 | 300 | 90.7 | 61.7 | 68.0 |

EXAMPLE 1(B)

In 300 ml. of pure water, 5.0 g. of vanadium pentoxide was suspended and dissolved by heating with the addition of 10 g. of oxalic acid. To this solution were added a solution of 47.6 g. of ammonium molybdate dissolved in 200 ml. of pure water by heating and further a solution of 4.7 g. of cupric chloride dissolved in 50 ml. of pure water. Then 200 g. of porous silicon carbide of 3 $\phi$mm. sphere was added as a carrier, and evaporated to dryness with stirring on a water bath, whereby the catalyst composition was allowed to adhere to the carrier. After dried at 120° C. for 2 hours, the matter was calcined in air for 3 hours at 340° C. A catalyst was obtained of which the composition comprised Mo:V:Cu=100:20:2 in atomic ratio and of which the supported rate calculated from the increase in weight of the catalyst obtained was 15.9%.

A reaction tube of an inner diameter of 20 mm. equipped with a nitre jacket made of SUS-27 stainless steel was packed with 50 ml. of the catalyst, wherein the catalytic oxidation of acrolein was carried out. A raw material gas whose composition comprised 4% of acrolein, 46% of steam and 50% of air was allowed to pass through it at a space velocity of 850 hr.$^{-1}$ with respect to the reference at 0° C. In the case of a bath temperature being 290° C., the conversion of acrolein was 99.5%, the yield and selectivity coefficient of acrylic acid were 94.8% and 95.3%, respectively.

EXAMPLES 2(B)–4(B)

Three different catalyst comprising molybdenum, vanadium and tin oxides which differ each in their respective contents of the tin component were prepared in the same manner as in Example 1(B) except that stannous chloride was used in place of the cupric chloride.

The results obtained on the same reaction as in Example 1(B) are shown in Table 1(B) in connection with the catalysts.

TABLE 1(B)

| | Atomic ratio | | | Supported rate (wt. percent) | Reaction temp. (° C.) | Percent Conversion of ACR | Yield of AA | Selectivity of AA |
|---|---|---|---|---|---|---|---|---|
| | Mo | V | Sn | | | | | |
| Example: | | | | | | | | |
| 2(B) | 100 | 20 | 4 | 15.9 | 260 | 99.6 | 91.7 | 92.7 |
| 3(B) | 100 | 20 | 10 | 15.9 | 290 | 99.8 | 94.5 | 94.7 |
| 4(B) | 100 | 20 | 20 | 13.0 | 320 | 97.8 | 88.3 | 90.3 |

EXAMPLES 5(B)–9(B)

Catalysts having such compositions as shown in Table 2(B) were prepared in the same manner as in Example 1(B), where ferrous chloride was used for the iron component, bismuth nitrate for the bismuth component, stannous chloride for the tin component and a colloidal silica sol for the silica component, respectively.

TABLE 2(B)

| | Catalyst composition (atomic ratio) | | | | | | Supported rate (percent) | Calcining condition | |
|---|---|---|---|---|---|---|---|---|---|
| | Mo | V | Fe | Sn | Bi | Si | | ° C. | Hours |
| Example: | | | | | | | | | |
| 5(B) | 100 | 20 | 10 | | | 60 | 16.1 | 340 | 3 |
| 6(B) | 100 | 20 | | | 4 | 60 | 18.3 | 360 | 3 |
| 7(B) | 100 | 20 | 10 | 20 | | 60 | 16.2 | 340 | 3 |
| 8(B) | 100 | 20 | 10 | | 4 | 60 | 16.7 | 380 | 3 |
| 9(B) | 100 | 20 | 10 | 10 | | 60 | 20.4 | 340 | 3 |

By using the catalysts described in Table 2(B), the reaction was carried out in the same manner as in Example 1(B). The results obtained are shown in Table 3(B).

TABLE 3(B)

| | Reaction temp. (° C.) | Percent Conversion of ACR | Yield of AA | Selectivity of AA |
|---|---|---|---|---|
| Example: | | | | |
| 5(B) | 240 | 97.6 | 90.2 | 92.4 |
| 6(B) | 300 | 97.5 | 92.0 | 94.4 |
| 7(B) | 310 | 96.1 | 87.2 | 90.7 |
| 8(B) | 280 | 98.2 | 91.7 | 93.4 |
| 9(B) | 240 | 99.5 | 93.6 | 94.1 |

EXAMPLE 10(B)

Two reaction tubes of an inner diameter of 16 $\phi$mm. and 600 mm. long which were equipped with nitre jackets (made of SUS-27) were connected in series with each other, and a two-steps successive reaction was carried out.

The first step tube was packed with 50 ml. of a catalyst containing molybdenum oxide as a chief component to be used for the production of acrolein, while the second step tube was packed with 30 ml. of the catalyst mentioned in Example 9(B). A mixed gas comprising 5% of propylene, 40% of steam and 55% of air was supplied to the first step tube, and the outlet gas of the first step tube was introduced to the second step tube without making any change in it.

The reaction conditions and the yields based on the propylene in the two steps each are shown in Table 4(B). As for by-products, they were chiefly carbon dioxide, carbon monoxide, acetic acid and acetaldehyde in both the first and second steps.

TABLE 4(B)

| | Reaction temp. (° C.) | Space velocity (hr.$^{-1}$) | Percent Conversion of propylene | Yield of ACR | Yield of AA |
|---|---|---|---|---|---|
| First step | 350 | 450 | 93.2 | 68.3 | 14.4 |
| Second step | 260 | 750 | 94.0 | 0.9 | 76.9 |

EXAMPLE 11(B)

By using the catalyst and reactors mentioned in Example 10(B), life tests were carried out on the two-steps successive reaction under a high pressure. In order to enlarge the activity variation, the reaction conditions were made severer than normal conditions.

|  | First step | Second step |
|---|---|---|
| Catalyst | Mo system | Mo-V-Sn-Si (SiC). |
| Raw material gas | Propylene (PP), 5%; Steam, 40%; Air, 55% | The first step product. |
| Space velocity (SV) [1] | 650 hr.$^{-1}$ | 2,000 hr.$^{-1}$ |
| Reaction temp | 370° C | 280° C |

[1] See the following:

$$SV = \frac{\text{Raw material gas flow velocity (l./hr.) under 3 atm. at 0° C.}}{\text{Volume of catalyst (l.)}}$$

TABLE 5(B)

| Analysis position | Reaction result | Days elapsed | | | |
|---|---|---|---|---|---|
| | | 1 | 10 | 20 | 30 |
| First step outlet. | PP conversion (percent) | 78.2 | 82.1 | 82.9 | 82.5 |
| | ACR yield (percent) | 61.4 | 65.9 | 66.9 | 66.5 |
| | AA yield (percent) | 11.3 | 10.2 | 9.0 | 9. |
| Second step outlet. | PP conversion (percent) | 79.7 | 83.4 | 84.2 | 84.0 |
| | ACR conversion (percent) | 24.2 | 24.7 | 26.1 | 25.5 |
| | AA yield (percent) | 44.4 | 45.7 | 46.5 | 45.9 |

However, the variations with the elapse of one month were very small as shown in Table 5(B), so that the catalyst was proved by the test to have very long lifetime.

EXAMPLE 12(B)

In 500 ml. of pure water, 12.7 g. of vanadium pentoxide was suspended and dissolved with the addition of 23.9 g. of oxalic acid with stirring on a water bath. To this solution were added a solution of 123.6 g. of ammonium molybdate dissolved in 500 ml. of pure water and a solution of 13.6 g. of bismuth nitrate dissolved in 100 ml. of pure water, then a solution of 15.2 g. of ferrous chloride dissolved in 200 ml. of pure water. To this mixed solution was added 49.2 g. of fine powdery silica gel, then evaporated to dryness with stirring on a water bath and dried at 150° C. for 2 hours in a drying oven. The matter obtained was pulverized to powders and pressed to make pellets of 4 $\phi$mm. x 4 mm.

The pellets were placed in a tube-type furnace and heated gradually in a stream of air and calcined at 360° C. for 3 hours to make a catalyst. The catalyst was an oxide of Mo:V:Fe:Bi:Si=100:20:10:4:100 in atomic ratio.

A reaction tube of an inner diameter of 20 mm. equipped with a nitre jacket made of SUS-27 stainless steel was packed with 50 ml. of the catalyst wherein the catalytic oxidation of acrolein was carried out. When a mixed gas comprising 4% of acrolein, 46% of steam and 50% of air was allowed to pass through it at a space velocity of 1050 hr.$^{-1}$ at a reaction temperature of 230° C., such results were obtained as the conversion of acrolein: 98.7%; the yield of acrylic acid: 89.0%; the selectivity coefficient of acrylic acid: 90.2%.

We claim:

1. A process for producing an α,β-unsaturated carboxylic acid selected from the group consisting of acrylic acid and methacrylic acid by catalytic vapor phase oxidation of the corresponding α,β-unsaturated aldehyde selected from the group consisting of acrolein and methacrolein which comprises contacting at an elevated temperature a gaseous mixture comprising the α,β-unsaturated aldehyde and molecular oxygen with a catalytic active composition which consists essentially of 100 atoms of molybdenum, 2 to 70 atoms of vanadium and oxygen; and 0 to 100 atoms of at least one member of a third metal selected from the group consisting of tin, iron, copper, and bismuth, the total atoms of the third metal being from 0 to 100, said vanadium having been introduced into said catalytic active composition from an aqueous vanadium source at least 15 mole percent of which is vanadyl oxalate.

2. A process for producing α,β-unsaturated acid as claimed in claim 1 in which said catalytic active composition contains vanadium in an amount of 5 to 70 atoms and wherein the third metal is not present in the composition.

3. A process for producing α,β-unsaturated acid as claimed in claim 1 in which said vanadium is present in an amount of 5 to 40 atoms, each of said third metals is present in an amount of 0 to 40 atoms and wherein the total amount of said third metals is from 2 to 70 atoms.

4. A process for producing α,β-unsaturated acid as claimed in claim 1 in which only one metal of the group consisting of the third metal components is present therein.

5. A process for producing an α,β-unsaturated carboxylic acid as claimed in claim 1 in which a combination of two metals selected from the third metal components is present therein.

6. A process for producing an α,β-unsaturated carboxylic acid as claimed in claim 5 in which said combination of two metals is selected from the group consisting of iron and tin, or iron and bismuth.

7. A process for producing α,β-unsaturated carboxylic acid as claimed in claim 1 in which said vanadyl source consists essentially of vanadyl oxalate.

8. A process for producing α,β-unsaturated carboxylic acid as claimed in claim 1 in which said vanadyl oxalate is produced in an aqueous medium from an oxalic acid source selected from the group consisting of oxalic acid and ammonium salts and amine salts of oxalic acid and vanadium source selected from the group consisting of vanadium pentoxide, polyacids of vanadium and polyacid salts of vanadium.

9. A process according to claim 8 wherein the oxalic acid source is oxalic acid and the amount of oxalic acid is 0.5 to 10-fold excess moles based upon the vanadium source calculated on the basis of $V_2O_5$.

10. A process for producing α,β-unsaturated carboxylic acid as claimed in claim 4 in which said α,β-unsaturated carboxylic acid is acrylic acid and said α,β-unsaturated aldehyde is acrolein.

11. The process as set forth in claim 1 in which the gaseous mixture is a gas containing the acrolein produced by vapor phase catalytic oxidation of propylene.

References Cited

UNITED STATES PATENTS

| 3,238,253 | 3/1966 | Kerr | 260—530 X |
| 3,352,905 | 11/1967 | Kerr | 260—530 X |
| 3,435,069 | 3/1969 | Bethell et al. | 260—530 X |
| 3,520,175 | 9/1970 | Yanagita et al. | 260—530 X |
| 3,567,772 | 3/1971 | Yanagita et al. | 260—530 X |

FOREIGN PATENTS

| 1,924,496 | 11/1969 | Germany | 260—530 X |

LORRAINE A. WEINBERGER, Primary Examiner

R. D. KELLY, Assistant Examiner

U.S. Cl. X.R.

252—456, 464, 467, 469, 470

UNITED STATES PATENT OFFICE
CERTIFICATE OF CORRECTION

Patent No. 3,773,828                    Dated November 20, 1973

Inventor(s)  Koju Kadowaki and Takeo Koshikawa

It is certified that error appears in the above-identified patent and that said Letters Patent are hereby corrected as shown below:

Page one, first column, line 5, after "Japan", insert the following:

--, assignors to Mitsubishi Petrochemical Company, Limited, Tokyo, Japan --.

Signed and sealed this 23rd day of April 1974.

(SEAL)
Attest:

EDWARD M. FLETCHER, JR.                 C. MARSHALL DANN
Attesting Officer                       Commissioner of Patents